US 6,595,168 B2

(12) United States Patent
Araki (10) Patent No.: US 6,595,168 B2
(45) Date of Patent: Jul. 22, 2003

(54) TWO-STROKE INTERNAL COMBUSTION ENGINE (75) Inventor: Tsuneo Araki, Tokyo (JP)

(73) Assignee: Kioritz Corporation, Tokyo (JP)

( * ) Notice: Subject to any disclaimer, the term of this patent is extended or adjusted under 35 U.S.C. 154(b) by 66 days.

(21) Appl. No.: 09/928,939

(22) Filed: Aug. 13, 2001

(65) Prior Publication Data

US 2002/0020370 A1 Feb. 21, 2002

(30) Foreign Application Priority Data

Aug. 14, 2000 (JP) ........................................ 2000-245801

(51) Int. Cl.[7] ................................................ F02B 33/04
(52) U.S. Cl. .................................. 123/73 PP; 123/65 A
(58) Field of Search .......................... 123/73 PP, 65 A, 123/73 V, 65 P, 195 R (56) References Cited

U.S. PATENT DOCUMENTS 4,445,468 A * 5/1984 Onishi et al. ............. 123/73 C
6,223,705 B1 * 5/2001 Sato et al. ................ 123/73 PP
6,257,179 B1 * 7/2001 Uenoyama et al. ....... 123/65 R

FOREIGN PATENT DOCUMENTS

| JP | 05033657 | 2/1993 |
| JP | 09125966 | 5/1997 |
| JP | 136725 | 5/2000 |

* cited by examiner

Primary Examiner—Tony M. Argenbright
Assistant Examiner—Katrina B. Harris
(74) Attorney, Agent, or Firm—Baker Botts LLP (57) ABSTRACT An air-preintroduction type, two-stroke internal combustion engine which is capable of minimizing the quantity of blow-by, thus making it possible to improve the fuel consumption and to reduce the content of poisonous components in the exhaust gases, and is also capable of reasonably and compactly arranging the peripheral components of the engine, thereby making it possible to reduce the number of parts, to lighten the weight thereof, to save the manufacturing cost thereof, and to simplify the working and assembling thereof. The engine is characterized in that an air inlet passageway for introducing air into the scavenging passageways of the engine is provided at a mating face between the cylinder and the crankcase of the engine.

8 Claims, 6 Drawing Sheets

TWO-STROKE INTERNAL COMBUSTION ENGINE

CROSS REFERENCE AND CLAIM OF PRIORITY TO RELATED APPLICATIONS

This application claims priority to Japanese Patent Application No. 2000-245801, filed Aug. 14, 2000.

BACKGROUND OF INVENTION

1. Field of the Invention

The present invention relates in general to a two-stroke internal combustion engine which is suited for use in a portable power working machine, and in particular to a two-stroke internal combustion engine which is designed to introduce air into a combustion actuating chamber prior to the introduction of the air-fuel mixture, thereby making it possible to minimize the quantity of so-called blow-by or the quantity of unburned air-fuel mixture discharged without being utilized for the combustion.

2. The Prior Art

An ordinary small air-cooled two-stroke internal combustion engine which is conventionally used in a portable power working machine, such as a chain saw and bush cutter, is constructed such that an ignition plug is disposed at the head portion of the cylinder and an intake port, a scavenging port and an exhaust port, which are to be opened and closed by a piston, are provided at the trunk portion of the cylinder. According to this two-stroke internal combustion engine, one cycle of the engine is accomplished by two strokes of the piston without undergoing a stroke which is exclusively assigned to the intake or exhaust.

More specifically, in the ascending stroke of the piston, an air-fuel mixture is introduced from the intake port into the crankcase disposed below the piston. During the subsequent descending stroke, the air-fuel mixture is pre-compressed producing a compressed gas mixture, which is then blown into a combustion actuating chamber which is disposed above the piston, thereby enabling waste combustion gas to be discharged through the exhaust port. In other words, since the scavenging of the waste combustion gas is effected by making use of the gas flow of the air-fuel mixture, the unburned air-fuel mixture is more likely to be mingled into the combustion gas (exhaust gas), thereby increasing the quantity of so-called blow-by or the quantity of air-fuel mixture that is discharged into atmosphere without being utilized for the combustion. Because of this, the two-stroke internal combustion engine is not only inferior in fuel consumption, but is also disadvantageous in that large amounts of poisonous components, such as HC (unburned components in fuel) and CO (incomplete combustion components in fuel), are included in the exhaust gas as compared with a four-stroke engine. Therefore, even if the two-stroke engine is small in capacity, the influence of these poisonous components on the environmental contamination should not be disregarded.

With a view to addressing these problems, there have proposed various kinds of so-called air-preintroduction type two-stroke internal combustion engines, in which an air inlet passageway for introducing external air is attached to a scavenging passageway so as to permit air to be introduced into the combustion actuating chamber in the descending stroke of the piston prior to the introduction of air-fuel mixture. The air thus pre-introduced functions to form an air layer between the waste combustion gas to be discharged and the unburned air-fuel mixture, thereby preventing the unburned air-fuel mixture from being mixed with the waste combustion gas and thus minimizing the quantity of blow-by of air-fuel mixture. See, for example, Japanese Patent Unexamined Publications H9-125966 and H5-33657, and Japanese Patent No. 3040758.

In such conventional air-preintroduction type two-stroke internal combustion engines, however, air inlet passageways (generally, since one or more pairs of right and left scavenging passageways are disposed, the air inlet passageway is bifurcated) are required to be separately installed outside the engine body (cylinder and crankcase) in order to introduce air into the scavenging passageway, etc. Also, a check valve, such as a reed valve, is required to be provided at a downstream end portion of each of air inlet passageways (at an upstream portion of each of one or more pairs of right and left scavenging passageways). Consequently, these conventional engines are accompanied by various problems, including an increased number of parts is required, the peripheral structure around the engine body, including the air-introducing passageways, is complicated, larger in size as a whole, and heavier in weight, the external appearance and assembling properties of the entire structure are poor, and a large space is required for the installation of the engine, which necessitates further improvements in order to mount the engine on a portable power working machine.

Additionally, since the crankcase is generally formed of a two-part structure (vertically split structure), it is troublesome both in working and assembly, and it is also difficult to reduce the weight and cost thereof.

The present invention overcomes the aforementioned problems associated with the conventional air-preintroduction type two-stroke internal combustion engine.

BRIEF SUMMARY OF THE INVENTION

It is an object of the present invention to provide an air-preintroduction type two-stroke internal combustion engine which is capable of reasonably and compactly arranging the peripheral components of the internal combustion engine, thereby making it possible to reduce the number of parts, to lighten the weight thereof, to save the manufacturing cost thereof, and to simplify the working and assembling thereof.

The aforementioned and other objects of the invention are realized by the provision of a two-stroke internal combustion engine which, in accordance with the present invention, includes: a cylinder in which a piston is adapted to be fittingly inserted; a combustion actuating chamber disposed above the piston; a crankcase hermetically and contiguously disposed below the cylinder and defining a crank chamber; a means for forming an air-fuel mixture; one or more pairs of scavenging passageways, each allowing the combustion actuating chamber to be communicated with the crankcase, symmetrically provided on both sides of a longitudinal section which divides an exhaust port provided on the sidewall of the cylinder into two equal parts; the scavenging passageways allowing air to be introduced therein; the air-fuel mixture-forming means allowing the air-fuel mixture to be introduced therefrom into the crank chamber; in the descending stroke of the piston, the exhaust port is first opened before a scavenging port formed at a downstream end of each scavenging passageway is opened; air is introduced via the scavenging passageways into the combustion actuating chamber prior to the introduction of the air-fuel mixture; and an air inlet passageway for introducing air into the scavenging passageways is provided at the mating face between the cylinder and the crankcase.

In one embodiment, the crankcase is provided with an air inlet port for introducing air into the air inlet passageway, and the air inlet port is provided with a check valve. Preferably, the air inlet passageway is an annular passageway formed at and opening downwardly through the lower end portion of the cylinder, the underside of the annular passageway being closed by an upper wall of the crankcase. The crankcase is preferably provided with a communicating passageway which communicates the annular air inlet passageway with the crank chamber, and the air inlet passageway also functions as an upper (or upstream) portion of the scavenging passageway.

In another embodiment, the air inlet port is provided with a pair of inlet ports communicating with the air inlet passageway, and a single reed valve functioning as the check valve is provided for opening or closing the pair of inlet ports.

The crankcase is preferably formed of a horizontally split structure having an upper crankcase and a lower crankcase, wherein the crankcase is divided by a horizontal plane passing through the central axis of a crankshaft which is rotatably supported by the crankcase, thereby forming the upper crankcase and the lower crankcase. Preferably, in this case, the lower crankcase is formed integrally with part of a fan casing for the engine.

In still another embodiment, the internal combustion engine is further provided with an air-feeding passageway for feeding air to the air inlet passageway through the air inlet port, and with an air-fuel mixture-feeding passageway for feeding the air-fuel mixture generated by the air-fuel mixture generating means to the crankcase, the air-feeding passageway and the air-fuel mixture-feeding passageway being arranged side by side.

In another embodiment of the invention, the air-fuel mixture generating means is a carburetor which is provided with the air-feeding passageway and the air-fuel mixture-feeding passageway, each passageway being provided with a throttle valve, and these throttle valves being linked with each other.

According to the preferred embodiments of two-stroke internal combustion engine of the present invention as described above, in the ascending stroke of the piston the external air is sucked via the air-feeding passageway, the air inlet port and the reed valve functioning as an air check valve into the air inlet passageway, and at the same time, this external air is introduced via the air inlet passageway into the scavenging passageways and the crank chamber so as to be reserved therein, and the air-fuel mixture provided by the air-fuel mixture-generating means is sucked via the reed valve functioning as an air-fuel mixture check valve into the crank chamber so as to be reserved therein.

When the air-fuel mixture inside the combustion actuating chamber disposed above the piston is ignited and burned, the piston is caused to be pushed downward due to the generation of combustion gases. In the descending stroke of the piston, the air and the air-fuel mixture existing in the air inlet passageway, the scavenging passageways and the crank chamber are compressed by the piston. At the same time, an exhaust port is opened, and, upon further descent of the piston, the scavenging port provided at a downstream end of each of the scavenging passageways is opened. During this scavenging period, only the air which has been contained in the scavenging passageways and the air inlet passageway and compressed by the piston is permitted to be introduced from the scavenging ports into the combustion actuating chamber.

As the piston further descends, the introduction of air from the scavenging ports to the combustion actuating chamber is completed, after which the air-fuel mixture that has been precompressed in the crank chamber is introduced via the scavenging passageways into the combustion actuating chamber until the scavenging period is completed.

As mentioned above, since air is introduced into the combustion actuating chamber from the scavenging ports prior to the introduction of the air-fuel mixture in the descending stroke of the piston, the waste combustion gas is forced, by this action of air, out of the exhaust port and is then discharged via a muffler into the external atmosphere without leaving a residue of waste combustion gas either in the combustion actuating chamber or in a portion near the inner wall of cylinder which is disposed opposite to the exhaust port.

In this case, a layer of the air that has been introduced in advance from the scavenging ports into the combustion actuating chamber is formed at an interface between the waste combustion gas and the air-fuel mixture that has been introduced later from the scavenging ports into the combustion actuating chamber. Due to the existence of this air layer, the air-fuel mixture is effectively prevented from being mixed with the waste combustion gas, thereby realizing a stratified scavenging. As a result, the quantity of so-called blow-by or the quantity of unburned air-fuel mixture discharged is minimized, thus making it possible to reliably and completely ignite the air-fuel mixture, to improve fuel consumption and to reduce the content of poisonous components in the exhaust gases.

Further, according to the two-stroke internal combustion engine of the present invention, an air inlet passageway for introducing air into the scavenging passageways is provided at the mating face between the cylinder and the crankcase, and in a more preferable embodiment, only a single-piece air check valve is provided. By contrast to the conventional internal combustion engine, where bifurcated air inlet passageways are required to be separately installed outside the engine body (cylinder and crankcase) and, still further, a check valve such as reed valve is required to be provided at a downstream end portion of each air inlet passageway (at an upstream portion of one or more pairs of right and left scavenging passageways), it becomes possible according to the present invention to reasonably and compactly arrange the peripheral components of the engine, thereby making it possible to reduce the number of parts, to lighten the weight thereof, to save the manufacturing cost thereof, and to simplify the working and assembling thereof.

As the crankcase is formed of a horizontally split structure having an upper crankcase and a lower crankcase, wherein the crankcase is divided by a horizontal plane passing through the central axis of a crankshaft, it becomes possible, as compared with the conventional crankcase of the prior art two-part structure (vertically split structure), to simplify the working and assembling of the engine and, at the same time, to increase the ratio of using synthetic resin, to thereby lighten the weight and save the manufacturing cost of the crankcase.

Since the feeding of air is performed using piston pumping and not an external pump, the entire structure of the engine can be simplified and the manufacturing cost thereof can be reduced

BRIEF DESCRIPTION OF THE SEVERAL VIEWS OF THE DRAWINGS

For a better understanding of the invention, reference may be made to the accompanying drawings, in which.

DETAILED DESCRIPTION OF THE REPRESENTATIVE EMBODIMENTS OF THE INVENTION

Figure 2:
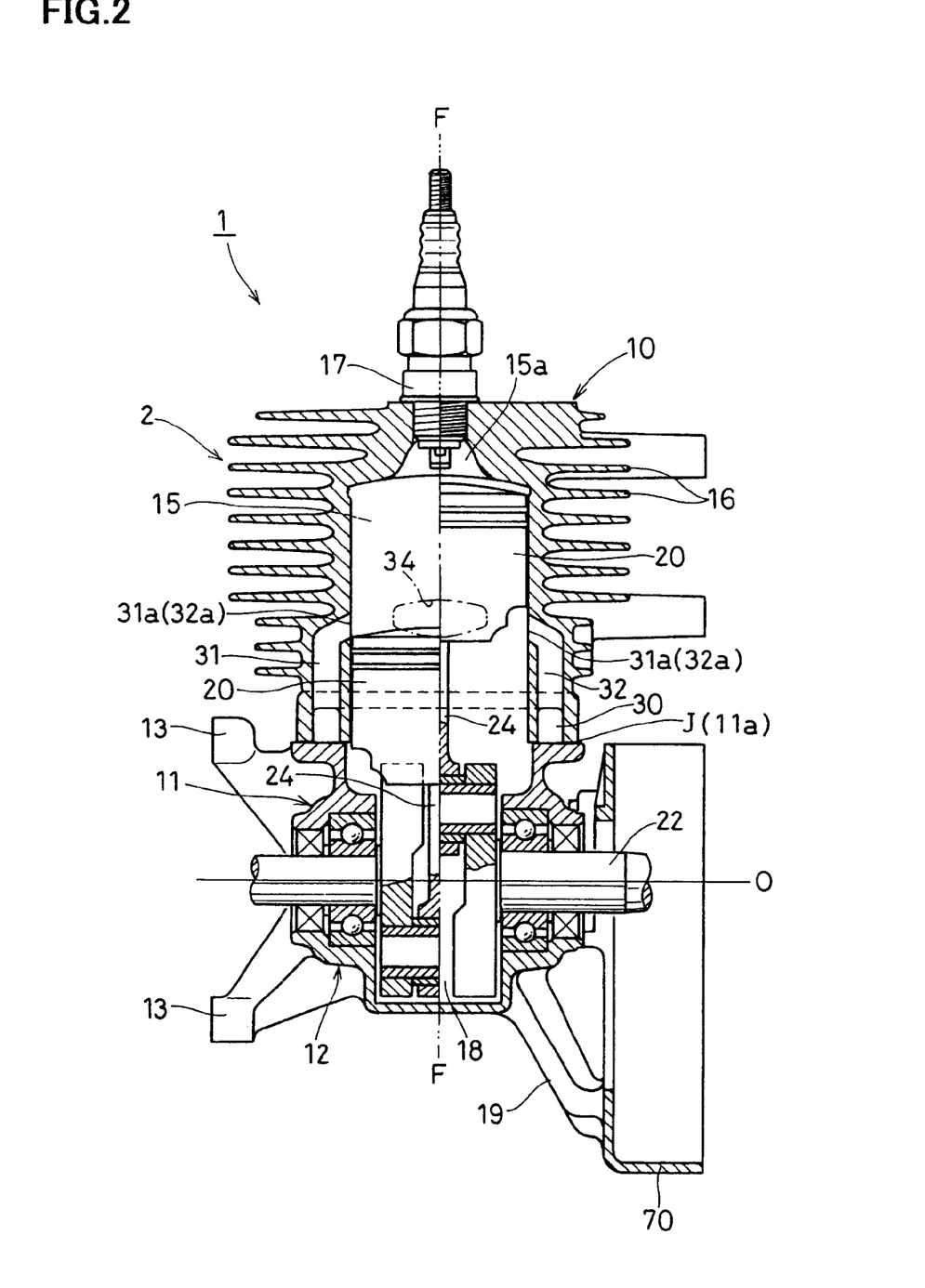
FIG. 2 is a cross-sectional view taken along the line II—II in FIG. 1.

The present invention will be further explained with reference to the drawings depicting one embodiment of the two-stroke internal combustion engine according to the invention. For convenience of explanation, the left side of the line F—F in FIG. 2 illustrates a longitudinal sectional view sectioning a first scavenging port where the piston is positioned at bottom dead center, while the right side thereof illustrates a longitudinal sectional view sectioning a second scavenging port where the piston is positioned at top dead center.

In the embodiment shown in the drawings, the two-stroke internal combustion engine 1 is formed of a small air-cooled two-stroke gasoline engine, which is adapted to be employed in a portable working machine. The engine 1 comprises a cylinder 10 in which a piston 20 is fittingly inserted, and a crankcase of a horizontally split structure having an upper crankcase 11 and a lower crankcase 12. The crankcase is disposed below the cylinder 10 and is hermetically fastened by means of four through-bolts 27 which are inserted respectively at the four corners of these three components (see FIGS. 3 and 4). The upper and lower crankcases 11 and 12 define a crank chamber 18 located below the cylinder 10 and rotatably support a crankshaft 22 which is designed to reciprocatively move a piston 20 up and down through a connecting rod 24.

The upper crankcase 11 is partitioned from the lower crankcase 12 by a horizontal plane (mating face K) passing through the central axis O of the crankshaft 22, so that the engine body (main body) 2 is constituted by three pieces, i.e. the upper crankcase 11, the lower crankcase 12 and the cylinder 10.

The upper and lower crankcases 11 and 12 are provided with four recoil starter-mounting support members 13 which are extended in a shape of X (in front view). The lower crankcase 12 is formed integrally with a portion 70 of the fan casing of a forced-air cooling fan (not shown) and also with the fan casing reinforcing support members 19.

The cylinder 10 is provided, on the outer circumferential wall thereof, with a plurality of cooling fins 16 and, at the head portion thereof, with a squish-dome shaped (semi-spherical) combustion chamber 15a. An ignition plug 17 protrudes into the combustion chamber 15a.

The combustion chamber 15a is sometimes referred to in the art as an actuating chamber, a cylinder chamber, etc. These chambers are referred to hereinafter generically as the "combustion actuating chamber 15".

An exhaust port 34 is located at one side (the right side in FIG. 1) of the trunk portion of the cylinder 10. A pair of first scavenging passages (downstream portion) 31 of Schnürle type (which are located on a side away from the exhaust port 34) and another pair of second scavenging passages (downstream portion) 32 of Schnürle type (which are located on a side close to the exhaust port 34) are symmetrically provided on both sides of the longitudinal section F—F (FIG. 2) which divides the exhaust port 34 into two equal parts. Further, a pair of first scavenging ports 31a and another pair of second scavenging ports 32a, both open to the combustion actuating chamber 15, are disposed at the upper ends (downstream ends) of the first scavenging passages 31 and the second scavenging passages 32, respectively.

Figure 1:
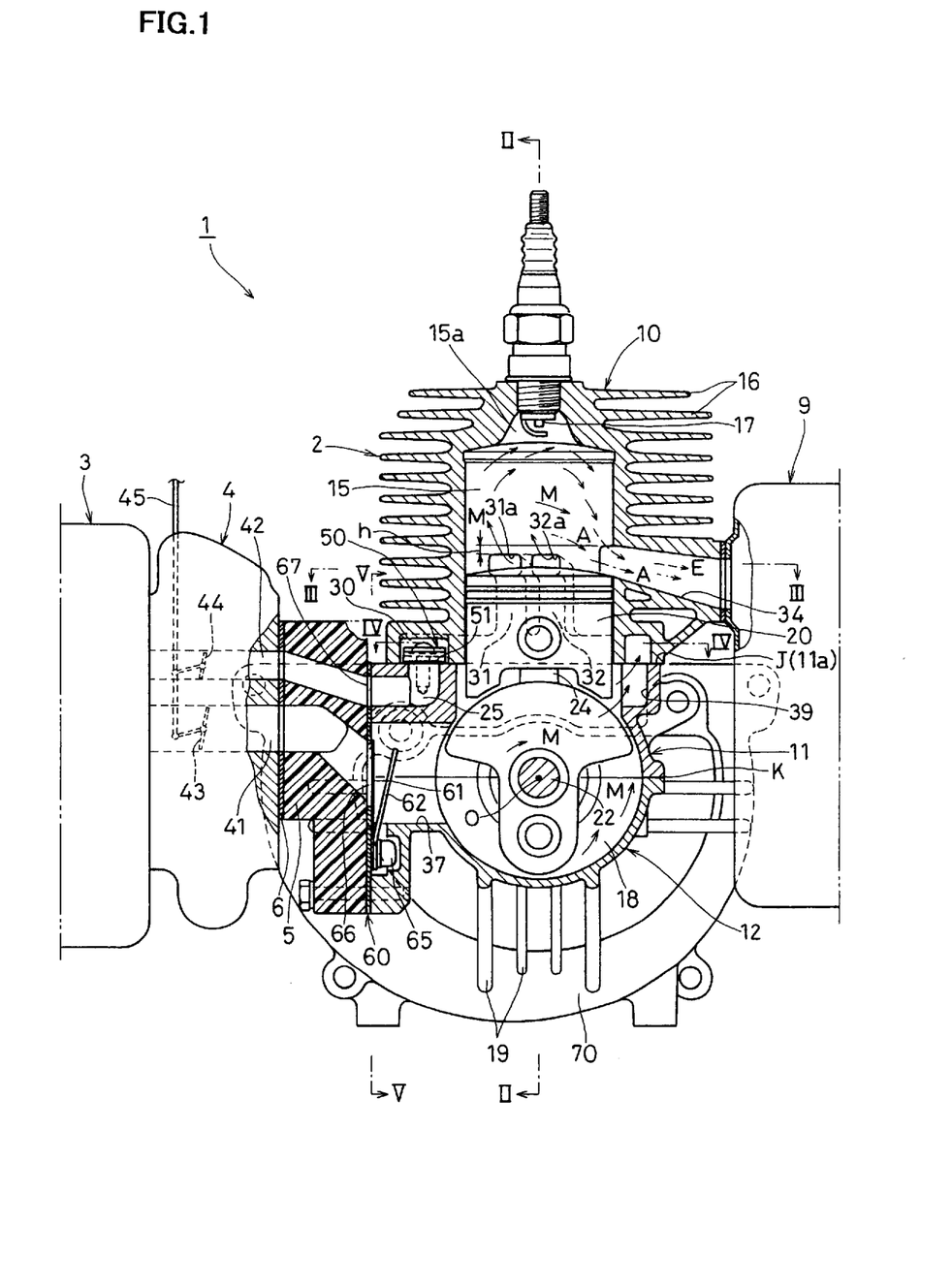
FIG. 1 is a longitudinal sectional view illustrating one embodiment of a two-stroke internal combustion engine according to the present invention, wherein the piston is positioned at bottom dead center.

In this embodiment, the top level of the first scavenging ports 31a is made identical with the top level of the second scavenging ports 32a, and these top levels are positioned lower than the top end of the exhaust port 34 by a distance of "h" (see FIG. 1). As a result, in the descending stroke of the piston 20, both the first scavenging ports 31a and the second scavenging ports 32a are permitted to open simultaneously a moment later than the exhaust port 34. The upstream portions of these first and second scavenging passages 31 and 32 are also employed to function as part of an annular air inlet passageway 30 as explained hereinafter, so that the first and second scavenging passages 31 and 32 communicate via the annular air inlet passageway 30 with the crank chamber 18.

Figure 3:
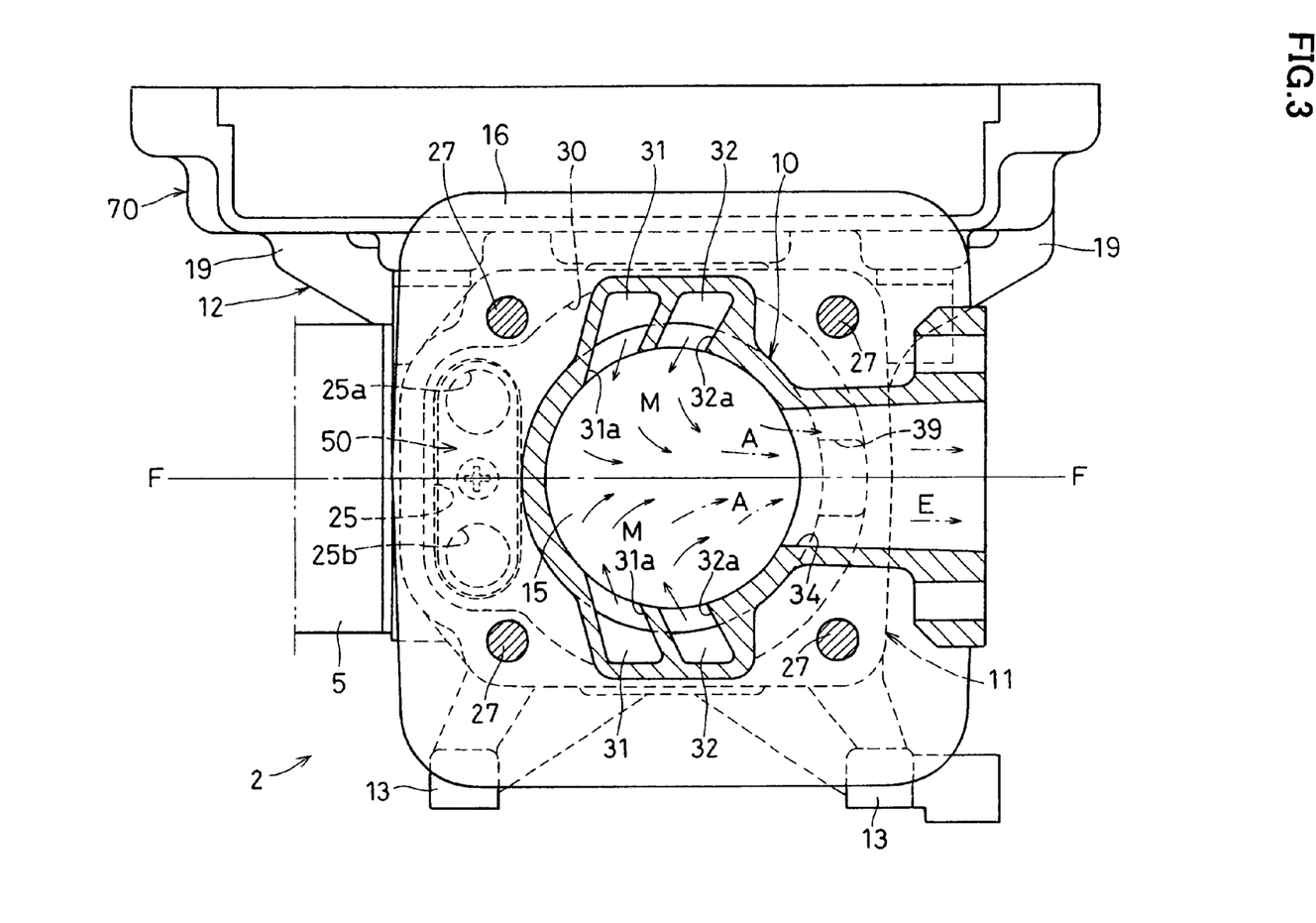
FIG. 3 is a cross-sectional view taken along the line III—III in FIG. 1.
Figure 4:
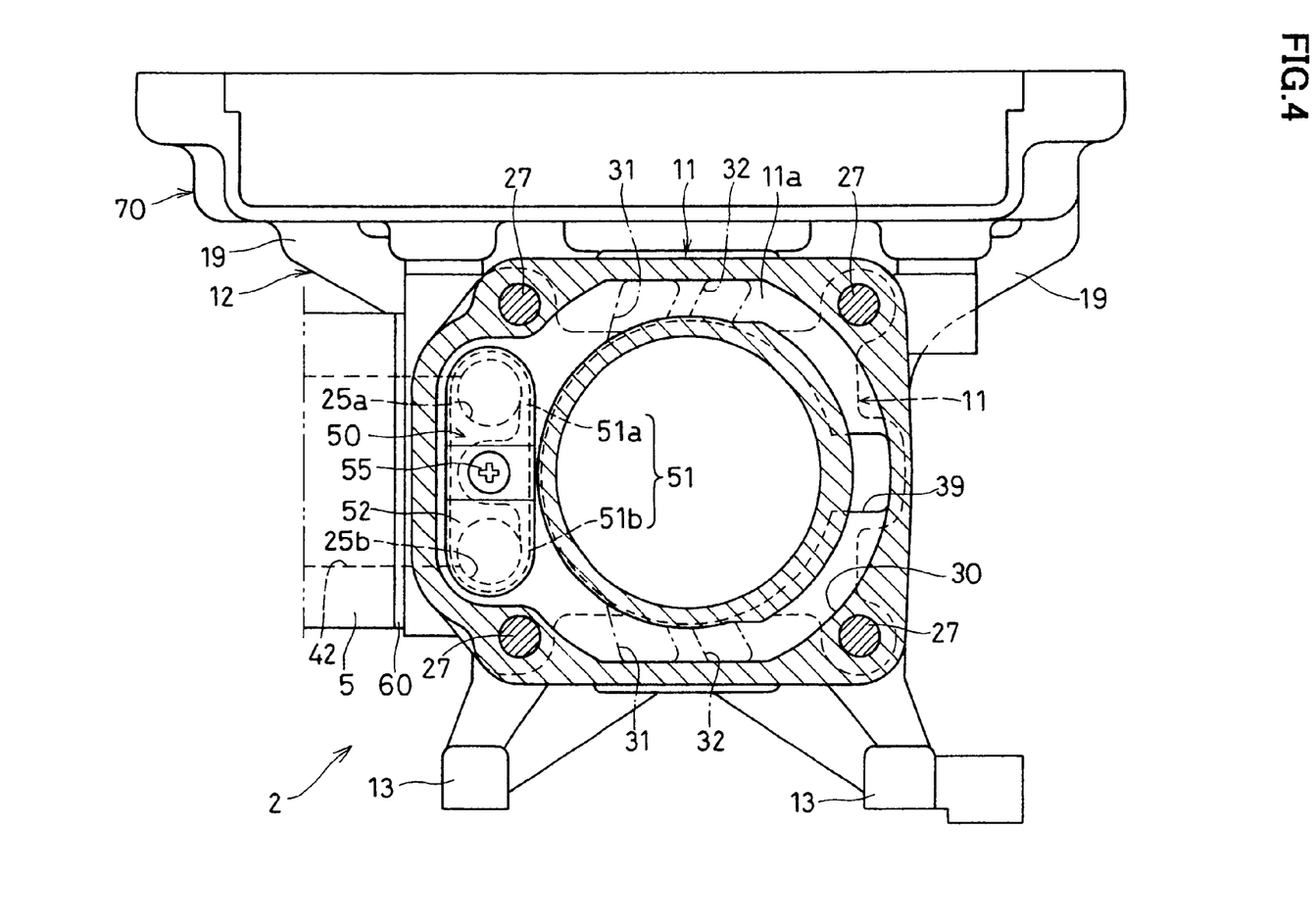
FIG. 4 is a cross-sectional view taken along the line IV—IV in FIG. 1.
Figure 5:
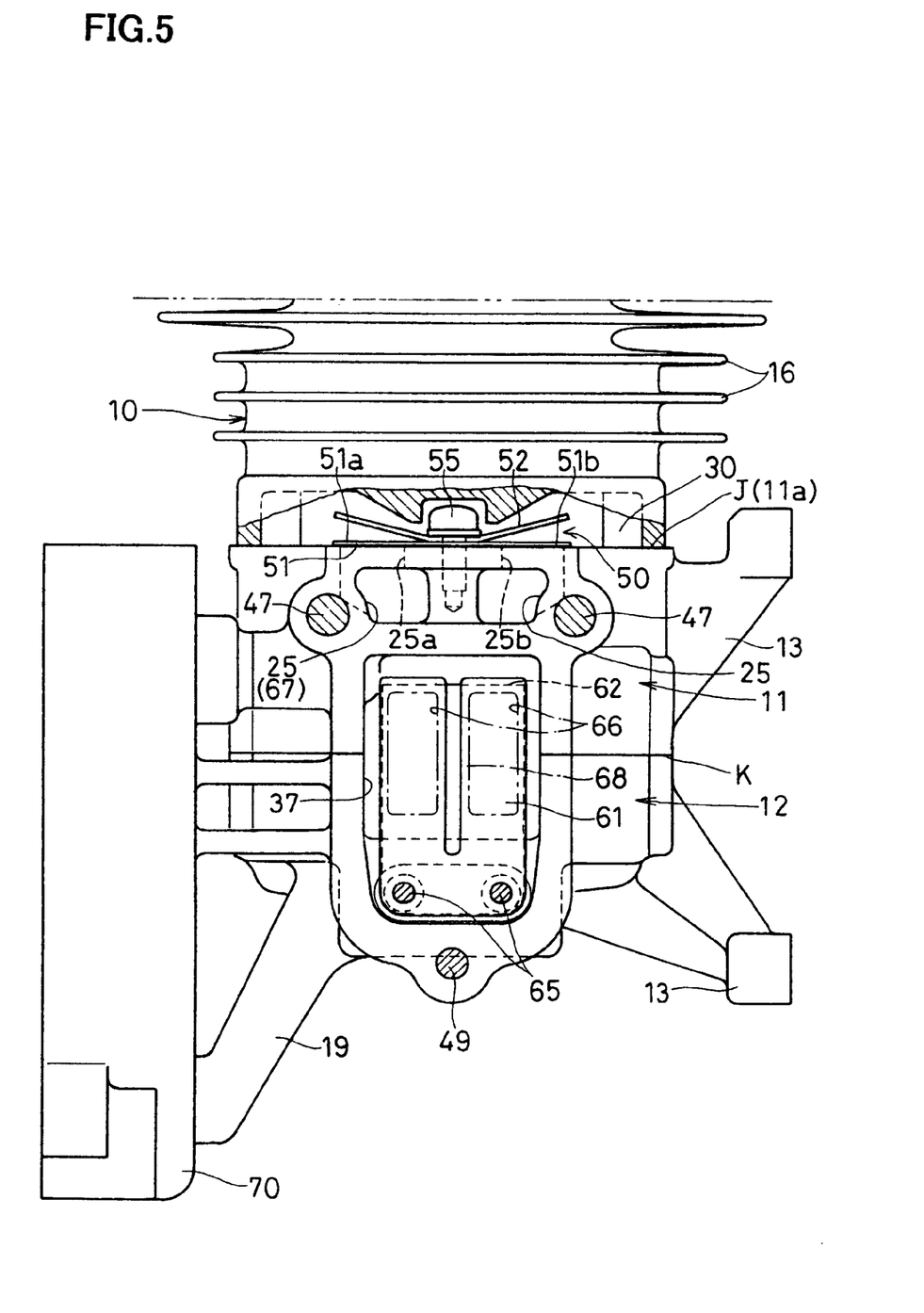
FIG. 5 is a cross-sectional view taken along the line V—V in FIG. 1.

According to this embodiment, the annular air inlet passageway 30 for introducing air "A" into the first and second scavenging passages 31 and 32 is provided at a mating face J between the cylinder 10 and the upper crankcase 11. More specifically, as seen in FIGS. 1, 3 and 4, the annular air inlet passageway 30, whose underside is open, is disposed at the lower end portion of the cylinder 10, and this open underside is closed by the top surface 11a (the aforementioned mating face J) of the crankcase 11.

As seen from FIGS. 1 and 3–5, an air inlet port 25 having a pair of inlet ports 25a and 25b and communicating with the air inlet passageway 30 for introducing the external air "A" into the air inlet passageway 30 is formed in the upper crankcase 11. Over the inlet ports 25a and 25b of the air inlet port 25, there is disposed a single air reed valve 50 functioning as an air check valve, so as to make it possible to open or close the pair of inlet ports 25a and 25b. The air reed valve 50 is constituted by an elastic tongue-shaped valve 51 having a left half element 51a and a right half element 51b which are designed to close or open the inlet ports 25a and 25b, respectively, a V-shaped stopper 52 disposed on the elastic tongue-shaped valve 51, and a screw 55 for securing the central portions of the tongue-shaped valve 51 and of the stopper 52 to the upper crankcase 11.

At an upper end portion of the upper crankcase 11 that is located close to the exhaust port 34, there is disposed a communicating passageway 39 for communicating the annular air inlet passageway 30 with the crank chamber 18. The air inlet passageway 30 is disposed so as to enable it to function as part of upstream portions of the first and second scavenging passages 31 and 32. According to this embodiment, the first and second scavenging passages 31 and 32 are joined together at a region close to the right and left central portions of the annular air inlet passageway 30.

The carburetor 4 is provided with an air feeding passageway 42 for guiding the external air "A" that has been cleaned by an air cleaner 3 to the air inlet passageway 30 through the air inlet port 25 and the air reed valve 50. The carburetor 4 also includes an air-fuel mixture feeding passageway 41 for guiding an air-fuel mixture "M" that has been produced in the carburetor 4 to the crank chamber 18 through a packing-attached air-fuel mixture reed valve 60 (or openings 66 thereof) and the air-fuel mixture inlet port 37. The air feeding passageway 42 and the air-fuel mixture feeding passageway 41 are arranged top and bottom, respectively, and are provided with throttle valves 44 and 43, respectively, which are designed to be linked with each other through a link member 45. The aforementioned packing-attached air-fuel mixture reed valve 60 is provided with an elastic tongue-shaped valve 61 and a stopper 62.

Figure 6:
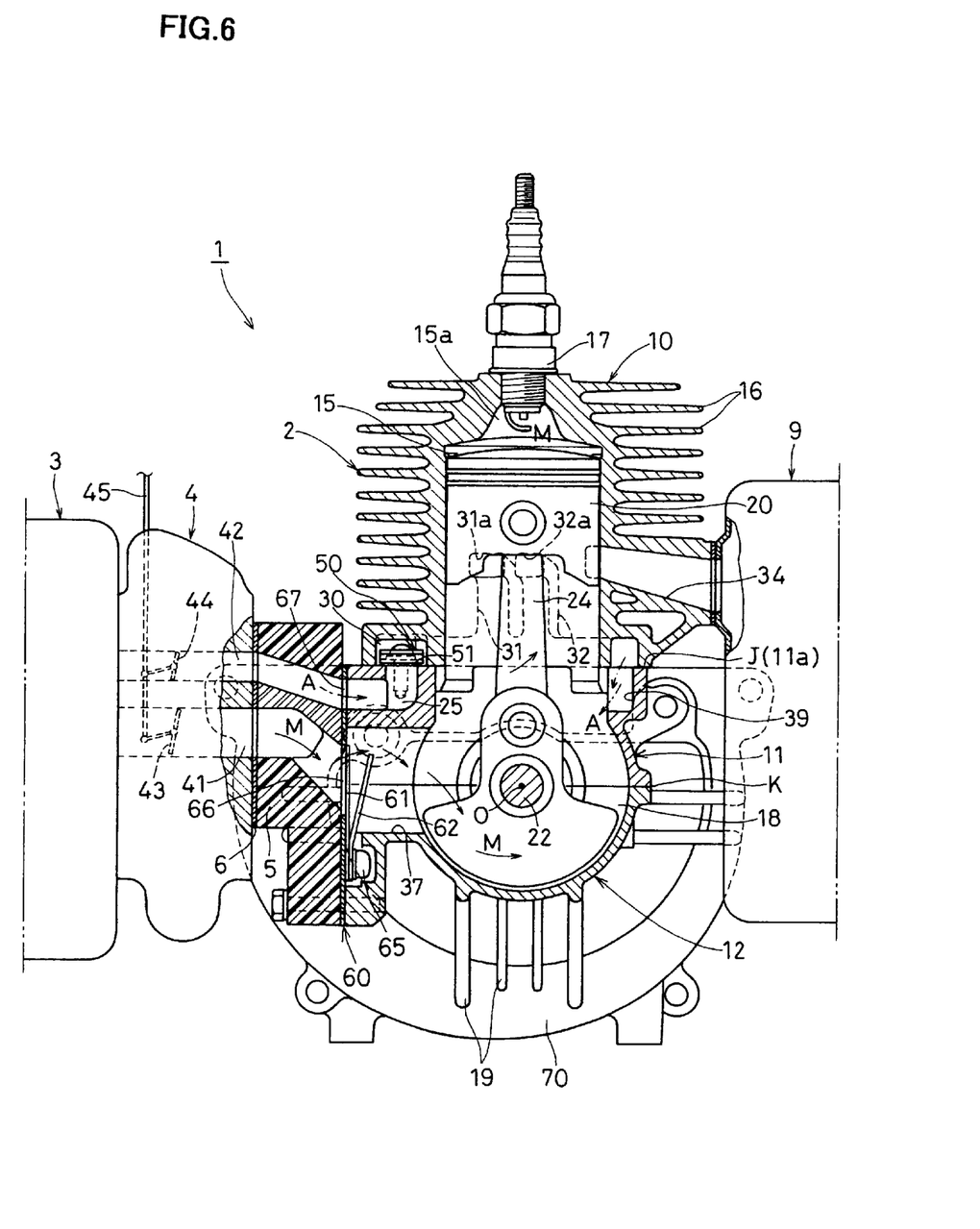
FIG. 6 is a longitudinal sectional view illustrating the engine shown in FIG. 1, wherein the piston is positioned at top dead center.

According to the foregoing embodiment of the two-stroke internal combustion engine 1, the external air "A" is sucked up and introduced through the air inlet passageway 42, the air inlet port 25 and the air reed valve 50 attached thereto into the air inlet passageway 30, and then is further introduced via the air inlet passageway 30 into the first and second scavenging passages 31 and 32 and also into the crank chamber 18, allowing the air to be stored therein. On the other hand, the air-fuel mixture supplied from the carburetor 4 is sucked up and introduced through the air-fuel mixture feeding passageway 41 and the packing-attached air-fuel mixture reed valve 60 into the crank chamber 18, allowing the air-fuel mixture to be stored therein (see FIG. 6).

When the air-fuel mixture "M" inside the combustion actuating chamber 15 disposed above the piston 20 is ignited and burned, the piston 20 is pushed down due to the generation of the combustion gases. During this descending stroke of the piston 20, the air "A" and the air-fuel mixture "M" existing in the air inlet passageway 30, the scavenging passageways 31 and 32, and the crank chamber 18 are compressed by the piston 20, and at the same time, the exhaust port 34 is first opened, and when the piston 20 has further descended, the first and second scavenging ports 31*a* and 32*b* provided at a downstream end of the scavenging passageways 31 and 32 are opened. During this scavenging period when the scavenging ports 31*a* and 32*b* are opened, only the air "A" which has been contained in the first and second scavenging passageways 31 and 32 and the air inlet passageway 30 and compressed by the piston 20 is permitted to be introduced into the combustion actuating chamber 15.

When the piston 20 descends still further, the introduction of air "A" from the scavenging ports 31*a* and 32*b* to the combustion actuating chamber 15 is completed, after which, following the air "A", the air-fuel mixture "M" that has been precompressed in the crank chamber 18 is introduced via the first and second scavenging passageways 31 and 32 into the combustion actuating chamber 15 until the scavenging period is completed.

As described above, since air "A" is introduced into the combustion actuating chamber 15 from the scavenging ports 31*a* and 32*b* prior to the introduction of the air-fuel mixture "M" in the descending stroke of the piston 20, the waste combustion gas "E" is forced, by the action of the air "A", out of the exhaust port 34 and is then discharged via a muffler 9 into the external atmosphere without leaving a residue of waste combustion gas "E" either in the combustion actuating chamber 15 or in a portion near the inner wall of the cylinder 10 which is disposed opposite to the exhaust port 34.

In this case, a layer of the air "A" that has been introduced in advance from the scavenging ports 31*a* and 32*b* into the combustion actuating chamber 15 is formed at an interface between the waste combustion gas "E" and the air-fuel mixture "M" that has been introduced later from the scavenging ports 31*a* and 32*b* into the combustion actuating chamber 15. Due to the existence of this air layer, the air-fuel mixture "M" is effectively prevented from being mixed with the waste combustion gas "E", thereby realizing almost a complete stratified scavenging. As a result, the quantity of so-called blow-by or the quantity of unburned air-fuel mixture "M" to be discharged is reduced to a minimum, thus making it possible to reliably and completely ignite the air-fuel mixture "M" and thereby to improve fuel consumption and reduce the content of poisonous components in the exhaust gases.

In accordance with the invention, the air inlet passageway 30 for introducing the air "A" into the scavenging passageways 31 and 32 is provided at the mating face "J" between the cylinder 10 and the upper crankcase 11, and still more, only a single-piece air check valve 50 is provided. Therefore, by contrast to the conventional internal combustion engine in which bifurcated air inlet passageways are required to be separately installed outside the engine body (cylinder and crankcase) and still more, a check valve such as a reed valve is required to be provided at a downstream end portion of each of air inlet passageways (at an upstream portion of one or more pairs of right and left scavenging passageways), it is possible according to the invention to reasonably and compactly arrange the peripheral components of the engine, thereby making it possible to reduce the number of parts, to lighten the weight thereof, to reduce the manufacturing cost thereof, and to simplify the working and assembling thereof.

Since the crankcase is formed as a horizontally split structure consisting of the upper crankcase 11 and the lower crankcase 12, wherein the crankcase is divided by a horizontal plane passing through the central axis "O" of the crankshaft 22, it is possible, as compared to the conventional crankcase of two-part structure (vertically split structure), to simplify the working and assembling of the engine and, at the same time, to increase the ratio of use of synthetic resin, thereby lightening the weight of the crankcase and saving the manufacturing cost thereof.

Moreover, since the feeding of air is achieved by the piston pumping, and not by an external pump as in the conventional engines, the entire structure of the engine can be simplified and the manufacturing cost thereof can be reduced.

Although the invention has been described and illustrated herein y reference to the foregoing embodiment, it will be understood that such embodiment is representative only and that it is susceptible of variation and modification without departing from the spirit and scope of the appended claims.

As seen from the above explanation, it is possible, according to the present invention, to minimize as much as possible the quantity of so-called blow-by or the quantity of air-fuel mixture to be discharged without being utilized for the combustion, thus making it possible to reliably and completely ignite the air-fuel mixture, to improve the fuel consumption and to reduce the content of poisonous components in the exhaust gases. Additionally, it is possible, according to the present invention, to provide an air-preintroduction type two-stroke internal combustion engine which is capable of reasonably and compactly arranging the peripheral components of engine, thereby making it possible to reduce the number of parts, to lighten the weight, to save in manufacturing cost, and to simplify the working and assembling of the engine.

What is claimed is:

1. An air-preintroduction type two-stroke internal combustion engine, comprising:

a cylinder;

a piston fittingly inserted into the cylinder for reciprocating movement therein;

a crankcase hermetically and contiguously disposed below the cylinder and defining a crank chamber; the crankcase adjoining the cylinder at a mating face;

a combustion actuating chamber disposed above and communicating with the cylinder;

an exhaust port provided in a sidewall of the cylinder;

means for forming an air-fuel mixture;

one or more pairs of scavenging passageways, each allowing the combustion actuating chamber to be communicated with the crankcase, symmetrically provided on both sides of a longitudinal section which divides the exhaust port into two equal parts;

the scavenging passageways allowing air to be introduced therein;

a scavenging port formed at a downstream end of said scavenging passageway;

the air-fuel mixture-forming means allowing the air-fuel mixture to be introduced therefrom into the crank chamber;

the exhaust port being first opened in the descending stroke of the piston before the scavenging ports are opened;

wherein air is introduced via the scavenging passageways into the combustion actuating chamber prior to the introduction of the air-fuel mixture;

an air inlet passageway for introducing air into the scavenging passageways provided at the mating face between the cylinder and the crankcase; and wherein the air inlet passageway is an annular passageway formed at an opening downwardly through the lower end portion of the cylinder, the open lower underside of the annular passageway being closed by an upper wall of the crankcase.

2. The two-stroke internal combustion engine according to claim 1, wherein:

the crankcase is provided with an air inlet port for introducing air into the air inlet passageway, and the air inlet port is provided with a check valve.

3. The two-stroke internal combustion engine according to claim 2, wherein:

the air inlet port is provided with a pair of inlet ports communicating with the air inlet passageway; and the check valve comprises a single reed valve for opening or closing the pair of inlet ports.

4. The two-stroke internal combustion engine according to claim 1, wherein:

the crankcase is provided with a communicating passageway communicating the annular air inlet passageway with the crank chamber; and the annular air inlet passageway also functions as an upper portion of the scavenging passageways.

5. The two-stroke internal combustion engine according to claim 1, wherein the crankcase is formed of a horizontally split structure having an upper crankcase and a lower crankcase, and wherein the crankcase is divided by a horizontal plane passing through the central axis of a crankshaft which is rotatably supported by the crankcase, thereby forming the upper crankcase and the lower crankcase.

6. The two-stroke internal combustion engine according to claim 5, wherein the lower crankcase is formed integrally with part of a fan casing for the engine.

7. The two-stroke internal combustion engine according to claim 1, further comprising:

an air-feeding passageway for feeding air to the air inlet passageway through the air inlet port; and an air-fuel mixture-feeding passageway for feeding an air-fuel mixture generated by said air-fuel mixture generating means to the crankcase, the air-feeding passageway and the air-fuel mixture-feeding passageway being arranged side by side.

8. The two-stroke internal combustion engine according to claim 1, wherein:

the air-fuel mixture generating means comprises a carburetor which is provided with the air-feeding passageway and the air-fuel mixture-feeding passageway;

each air-feeding passageway and air-fuel mixture-feeding passageway being provided with a throttle valve; and the throttle valves being linked with each other.

* * * * *